Patented Dec. 12, 1939

2,182,817

UNITED STATES PATENT OFFICE 2,182,817

LIQUID TRIARYL PHOSPHATES

Clarence L. Moyle, Midland, Mich., assignor to The Dow Chemical Company, Midland, Mich., a corporation of Michigan No Drawing. Application December 1, 1938, Serial No. 243,323

7 Claims. (Cl. 260—461)

This invention concerns certain new aromatic phosphates useful as plasticizing agents in the preparation of cellulose ether plastic compositions.

It is known that certain aromatic phosphates, e. g. triphenyl phosphate, diphenyl mono-o-xenyl phosphate, tri-o-xenyl phosphate, etc., are useful as plasticizing agents in the preparation of plastic compositions comprising cellulose ethers, e. g. ethylcellulose, propylcellulose, benzylcellulose, etc. Among such known aromatic phosphates, those containing one or more p-tertiarybutylphenyl groups, e. g. tri-p-tertiary-butylphenyl phosphate, di-p-tertiarybutylphenyl mono-p-xenyl phosphate, mono-p-tertiarybutylphenyl di-o-xenyl phosphate, etc., have been found to be particularly useful for such purpose since they impart a high degree of flexibility to cellulose ethers and at the same time do not materially soften or weaken the same. In some instances, the plasticized compositions are even harder than the unplasticized products. However, a number of the p-tertiarybutylphenyl phosphates are crystalline solids at ordinary temperatures, and this property detracts somewhat from their utility as plasticizing agents since they have a tendency to crystallize and to exude to the surface of the compositions into which they have been incorporated, thereby causing blushing or blooming of the plasticized compositions.

I have now found that by introducing a methyl group into the ortho position of the p-tertiarybutylphenyl radical of such triaryl phosphates, it is possible to obtain liquid products which possess substantially the same desirable plasticizing action on cellulose ethers as do the p-tertiarybutylphenyl phosphates, but which, because of their liquid state, do not cause blushing of the compositions into which they are incorporated. The invention, then, concerns the new liquid triaryl phosphates having the general formula:

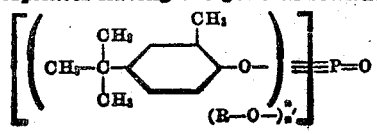

wherein R represents an aryl radical, and $n$ and $n'$ each represents an integer, the sum of $n$ and $n'$ being equal to 3.

The new p-tertiarybutyl-o-tolyl phosphates having the above formula are prepared by reacting a phosphorus oxyhalide, e. g. phosphorus oxychloride or phosphorus oxybromide, with p-tertiarybutyl-o-cresol and, if required, with another phenol, e. g. phenol, cresol, naphthol, p-cyclohexylphenol, 2.4-dimethylphenol, etc., or an alkali metal salt thereof. When tri-p-tertiarybutyl-o-tolyl phosphate is the product desired, a phosphorus oxyhalide is reacted directly with approximately three molecular equivalents of p-tertiarybutyl-o-cresol. When a mixed triaryl phosphate of the present class, e. g. p-tertiarybutyl-o-tolyl di-o-xenyl phosphate, di-p-tertiarybutyl-o-tolyl mono-p-ethylphenyl phosphate, etc., is the product desired, a phosphorus oxyhalide is reacted with p-tertiarybutyl-o-cresol to form a p-tertiarybutyl-o-tolyl phosphoric acid dihalide or a di-p-tertiarybutyl-o-tolyl phosphoric acid mono-halide, and such intermediate product is then reacted with another phenol to form the desired mixed triaryl phosphate. If desired, the order in which the different phenols are reacted may be changed. Thus, a phosphorus oxyhalide may first be reacted with a phenol other than p-tertiarybutyl-o-cresol to form an aryl phosphoric acid mono- or di-halide, which product may then be reacted with p-tertiarybutyl-o-cresol to form the desired product.

Each of the above reactions is carried out by heating a mixture of the necessary reactants to a temperature at which hydrogen halide is evolved from the reaction mixture, preferably in the presence of a catalyst such as metallic calcium, magnesium, or aluminum, or a chloride of magnesium, aluminum or iron. The reactions are preferably carried out at the lowest convenient temperature, e. g. below about 200° C., since at higher temperatures by-product formation may occur to an objectionable extent.

In preparing a mixed triaryl phosphate of the present class from a phosphorus oxyhalide and the necessary phenolic compounds, the intermediate phosphoric acid halide product may be separated and purified, e. g. by fractional distillation, before carrying out the successive reaction for the formation of the mixed triaryl phosphate product. In practice, however, it is usually more convenient merely to distill any unreacted phosphorus oxyhalide from the crude intermediate aryl phosphoric acid halide, add the necessary proportion of the second phenol, and continue the reaction as hereinbefore described to obtain the final product. After the reactions for the formation of the triaryl phosphate product are completed, the reaction mixture is usually blown with air or washed with water to remove hydrogen halide therefrom. The resulting product consists largely of a single mixed triaryl phosphate, but may contain a minor proportion of a second mixed triaryl phosphate as well as some symmetrical triaryl phosphate formed by over-reaction of one of the phenolic reactants with the phosphorus oxyhalide in the initial stage of the process. Such impure mixed phosphate product is adapted to most of the uses to which the pure compound is suitable and, accordingly, is a valuable product. When desired, the individual phosphates contained in such product can usually be separated by fractional distillation.

The following examples will illustrate several ways in which the principle of the invention has been applied but are not to be construed as limiting the same:

Example 1

A mixture of 246 grams (1.5 mols) of p-tertiary-butyl-o-cresol, 77 grams (0.5 mol) of phosphorus oxychloride, and 2 grams of magnesium metal was heated at a temperature of 160° C. for six hours, after which time the mixture was blown with air for two hours. A total of 1.45 mols (96.7 per cent of the theoretical) of hydrogen chloride was evolved from the mixture during the reaction. The mixture was dissolved in an equal weight of o-dichlorbenzene and the resulting solution was washed successively with dilute hydrochloric acid and water. The washed product was then fractionally distilled under vacuum whereby there was obtained 236 grams (88 per cent of the theoretical yield) of tri-p-tertiarybutyl-o-tolyl phosphate, a colorless viscous liquid distilling at approximately 304° to 308° C. under 8 millimeters pressure and having an index of refraction, $$n_D^{20} = 1.5182$$

Tri-p-tertiarybutyl-o-tolyl phosphate has the formula:

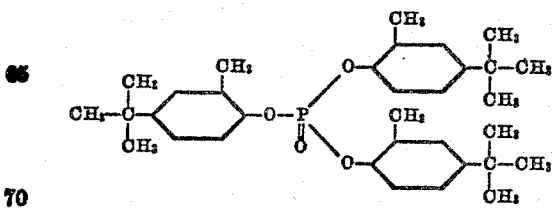

Example 2

A mixture of 150 grams (1.0 mol) of p-tertiarybutylphenol, 462 grams (3.0 mols) of phosphorus oxychloride, and 1.0 gram of magnesium metal was heated at a temperature of 80° to 88° C. for 1 hour during which time 0.95 mol of hydrogen chloride was evolved from the mixture. The excess phosphorus oxychloride was then distilled from the mixture, 1.91 mols being recovered. The crude p-tertiarybutylphenyl phosphoric acid dichloride was then cooled and 328 grams (2.0 mols) of p-tertiarybutyl-o-cresol was added. The mixture was heated at 160° C. for 6½ hours after which time it was blown with air for 1 hour to remove last traces of hydrogen chloride. The crude phosphate product was then diluted with o-dichlorbenzene, washed, and fractionally distilled as in Example 1. There was obtained 433 grams (82.8 per cent of the theoretical yield) of di-p-tertiary butyl-o-tolyl mono-p-tertiarybutyl phenyl phosphate, a viscous colorless liquid distilling at approximately 310° to 314° C. under 8 millimeters pressure and having a specific gravity of about 1.070 at 25/25° C. and an index of refraction, $$n_D^{20} = 1.5088$$

This compound has the formula:

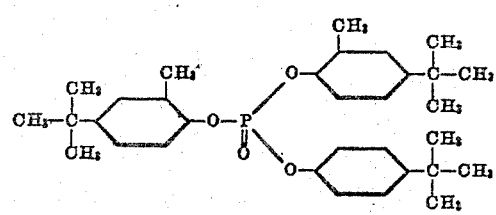

Example 3

A mixture of 246 grams (1.5 mols) of p-tertiarybutyl-o-cresol, 694 grams (4.5 mols) of phosphorus oxychloride, and 1.5 grams of magnesium metal was heated at 80° to 90° C. for 1 hour, after which time the excess phosphorus oxychloride was distilled from the mixture. 510 grams (3.0 mols) of p-phenylphenol was then added and the mixture was heated at 160° C. for 8 hours. The mixture was then blown with air and washed to remove hydrogen chloride, as in Example 2, and was fractionally distilled under vacuum. There was obtained 632.5 grams (77 per cent of the theoretical yield) of p-tertiarybutyl-o-tolyl di-p-xenyl phosphate, a pale-yellow viscous liquid distilling at approximately 378° to 385° C. under 8 millimeters pressure and having an index of refraction, $$n_D^{20} = 1.5954$$

and the formula:

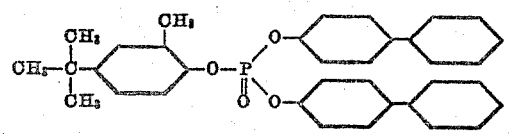

Other triaryl phosphates of the present class which have been prepared by procedure similar to that set forth in the above examples are set forth in the following table:

Table

| Compound | | Appearance | Distillation range, °C. at 8 mm. | Specific gravity at 25/25° C. | Index of refraction $n_D^{20}$ |
| Name | Formula | | | | |
| --- | --- | --- | --- | --- | --- |
| p-Tertiarybutyl-o-tolyl di-p-tertiarybutyl-phenyl phosphate. | | Colorless viscous liquid. | 314 to 318 | 1.068 | 1.5206 |
| p-Tertiarybutyl-o-tolyl di-o-xenyl phosphate. | | ......do.......... | 340 to 345 | 1.162 | 1.5854 |
| Di-p-tertiarybutyl-o-tolyl mono-phenyl phosphate | | ......do.......... | 280 to 285 | 1.098 | 1.5272 |

The phenolic reactants other than p-tertiarybutyl-o-cresol employed in preparing mixed triaryl phosphates of the present class may contain any of the neutral substituents, such as halogen, aryl, alkyl, or cycloalkyl substituents, which are non-reactive with phosphorus oxyhalide under the reaction conditions employed, in which case correspondingly substituted triaryl phosphates will be obtained. Certain of such substituted triaryl phosphates have been described in the foregoing examples and table. Other phosphates of this type are: p-tertiarybutyl-o-tolyl di-naphthyl phosphate, di-p-tertiarybutyl-o-tolyl mono-2,4-dichlorphenyl phosphate, p-tertiarybutyl-o-tolyl di-2-methyl-5-isopropylphenyl phosphate, p-tertiarybutyl-o-tolyl di-p-cyclohexylphenyl phosphate, di-p-tertiarybutyl-o-tolyl mono-p-tertiary-octylphenyl phosphate, p-tertiarybutyl-o-tolyl di-2,4,6-triethylphenyl phosphate, etc.

Other modes of applying the principle of my invention may be employed instead of those explained, change being made with regard to the method or terms employed provided the products stated by any of the following claims be obtained.

I therefore particularly point out and distinctly claim as my invention:

1. A liquid triaryl phosphate having the general formula:

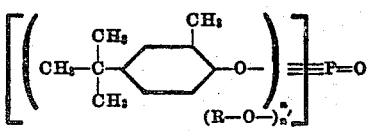

wherein R represents an aryl radical and $n$ and $n'$ each represents an integer, the sum of $n$ and $n'$ being equal to 3.

2. A liquid triaryl phosphate having the general formula:

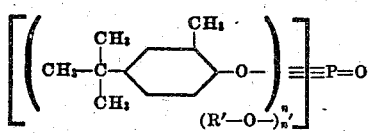

wherein R' represents an aryl radical selected from the class consisting of phenyl, alkyl-phenyl, cycloalkyl-phenyl, halo-phenyl and aryl-phenyl radicals, and $n$ and $n'$ each represents an integer, the sum of $n$ and $n'$ being equal to 3.

3. A liquid triaryl phosphate having the general formula:

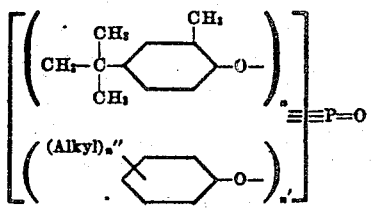

wherein $n$ and $n'$ each represents an integer, the sum of $n$ and $n'$ being equal to 3, and $n''$ represents an integer not greater than 3.

4. A liquid triaryl phosphate having the general formula:

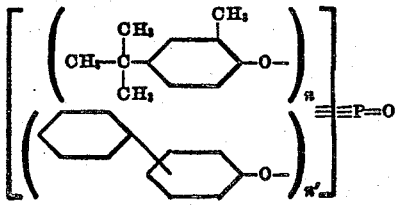

wherein $n$ and $n'$ each represents an integer, the sum of $n$ and $n'$ being equal to 3.

5. Tri-p-tertiarybutyl-o-tolyl phosphate, a colorless viscous liquid distilling at approximately 304° to 308° C. under 8 millimeters pressure, and having an index of refraction, $$n_D^{20} = 1.5182$$

and the formula:

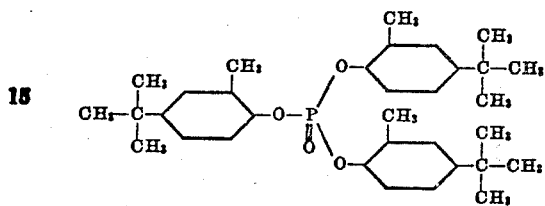

6. Di-p-tertiarybutylphenyl mono-p-tertiarybutyl-o-tolyl phosphate, a colorless viscous liquid distilling at approximately 314° to 318° C. under 8 millimeters pressure, and having a specific gravity of about 1.068 at 25/25° C. and the formula:

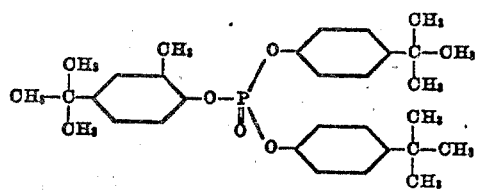

7. Di-p-xenyl mono-p-tertiarybutyl-o-tolyl phosphate, a pale-yellow viscous liquid distilling at approximately 378° to 385° C. under 8 millimeters pressure, and having an index of refraction $$n_D^{20} = 1.5954$$

and the formula:

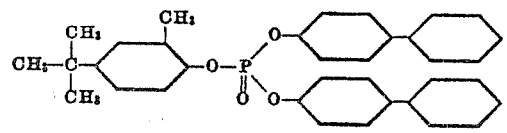

CLARENCE L. MOYLE.